United States Patent [19]

Kramer et al.

[11] Patent Number: 4,813,880
[45] Date of Patent: Mar. 21, 1989

[54] ARRANGEMENT FOR MAIN DISTRIBUTION FRAMES

[75] Inventors: Dieter Kramer, Idstein-Heftrich; Helmut Barkow, Steinbach, both of Fed. Rep. of Germany

[73] Assignee: Telenorma Telefonbau und Normalzeit GmbH, Fed. Rep. of Germany

[21] Appl. No.: 86,685

[22] Filed: Aug. 18, 1987

[30] Foreign Application Priority Data

Aug. 30, 1986 [DE] Fed. Rep. of Germany ....... 3629551

[51] Int. Cl.$^4$ .............................................. H01R 9/09
[52] U.S. Cl. ....................................... 439/65; 439/78; 439/507
[58] Field of Search ....................... 439/65, 53, 52, 78, 439/81–82, 377, 500, 507, 510, 514

[56] References Cited

U.S. PATENT DOCUMENTS 4,384,754 5/1983 Douty et al. ............... 339/17 M
4,603,930 8/1986 Ito ............................ 439/78

FOREIGN PATENT DOCUMENTS 1140986 12/1962 Fed. Rep. of Germany .
1165094 3/1964 Fed. Rep. of Germany .
2110528 3/1971 Fed. Rep. of Germany .

Primary Examiner—Gil Weidenfeld
Assistant Examiner—Paula A. Austin
Attorney, Agent, or Firm—Steele, Gould & Fried

[57] ABSTRACT

A disconnecting distribution frame for a small telephone extension system with a plurality of electrical terminals arranged in pairs, each pair of terminals being equipped with corresponding plug contacts and being electrically interconnectable by means of a coupling plug, is formed from one half of a conventional disconnecting distribution frame which is attached to the carrier of a subassembly rack having a guide strip for a printed circuit board. The other half of the disconnecting distribution frame is formed by plug contacts. These plug contacts are attached to the printed circuit board, which is inserted into the guide and correspond in height to the plug contacts on the carrier and are aligned with these. A coupler plug for making the electrical connection is attached to every two plug pins located opposite one another.

13 Claims, 2 Drawing Sheets

ARRANGEMENT FOR MAIN DISTRIBUTION FRAMES

BACKGROUND OF THE INVENTION

The invention relates to an arrangement for main distribution frames for a telecommunication system, for example for a small telephone extension system. A plurality of electrical terminals are arranged in pairs, the terminals being, for example, soldering tabs, clamping connectors, terminal screws, etc. Each pair of terminals is equipped with corresponding plug contacts and the conductors in a pair are electrically connectable by means of a coupler plug.

Disconnecting distribution frames serve for the physical connection of distributed lines, such as, for example, subscriber lines, junction lines, etc., to a telecommunication system. For this purpose, the disconnecting distribution frames are equipped with soldering tabs, clamping connectors, terminal screws, etc. The wires of the distributed lines and the wires of lines leading to the telecommunication system are connected to the disconnecting distribution frame. For connecting the external and the internal wiring, one or more terminals, connected electrically to one another, are provided in each case. This connection can be either an unbreakable connection or a breakable connection. At the same time, disconnecting distribution frames make it possible to disconnect these connections for operational and test purposes. This can be carried out, for example, by means of a coupler plug connecting the two terminals.

German Patent Specification No. 1,027,243 describes a disconnecting and switching soldering tab-board with shielded contact sets, in which each pair of terminals can be connected electrically by means of a coupler plug. To disconnect the line, it is merely necessary to pull the coupler plug. For test purposes a plug identical to the coupler plug can be attached, but this must not have an internal connection, so that test operations can be carried out in both directions from the disconnection point.

SUMMARY OF THE INVENTION

The wiring of a disconnecting distribution frame of this type involves a high outlay and is time-consuming. An object of the present invention is to provide a disconnecting distribution frame, in which the outlay in wiring terms is drastically reduced.

This object is achieved because a first plug contact is attached to a carrier having one or more guide slots for the insertion of printed circuit boards, and a second plug contact is attached to a printed circuit board.

In practical embodiment, the disconnecting distribution frame according to the invention comprises two parts, one part comprising one half of a conventional disconnecting distribution frame, that is to say having the electrical terminal and the associated plug contact, and the other half of the disconnecting distribution frame being shifted to the printed circuit board carrying the functional interface of the telecommunication system. At the same time, as for each pair, connection between the terminal of the external line and the telecommunication system is made by means of the known coupler plug. There is no need for wiring at the telecommunication system, since the direct connection between the disconnecting distribution frame and the telecommunication system itself is made by means of the plug contact on the printed circuit board. The outlay in wiring terms involved in a disconnecting distribution frame according to the invention is thus reduced by half.

Further advantages will be apparent from the description herein.

BRIEF DESCRIPTION OF THE DRAWINGS

The invention is explained in detail with reference to an exemplary embodiment which is illustrated in the drawings. In this.

DETAILED DESCRIPTION OF THE PREFERRED EMBODIMENTS

Figure 3:
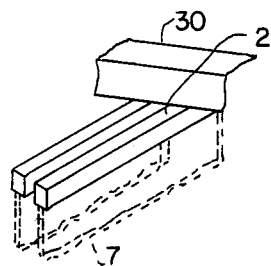
FIG. 3 shows a general schematic of the subassembly rack, carrier and printed circuit board.
Figure 1:
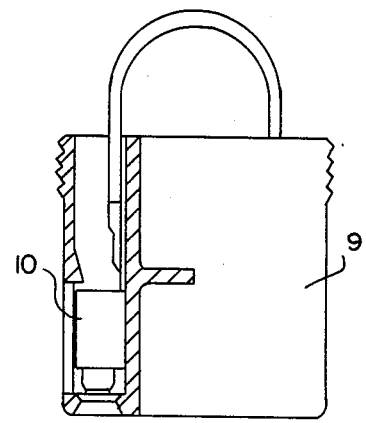
FIG. 1 shows a front view of the disconnecting distribution frame.
Figure 1:
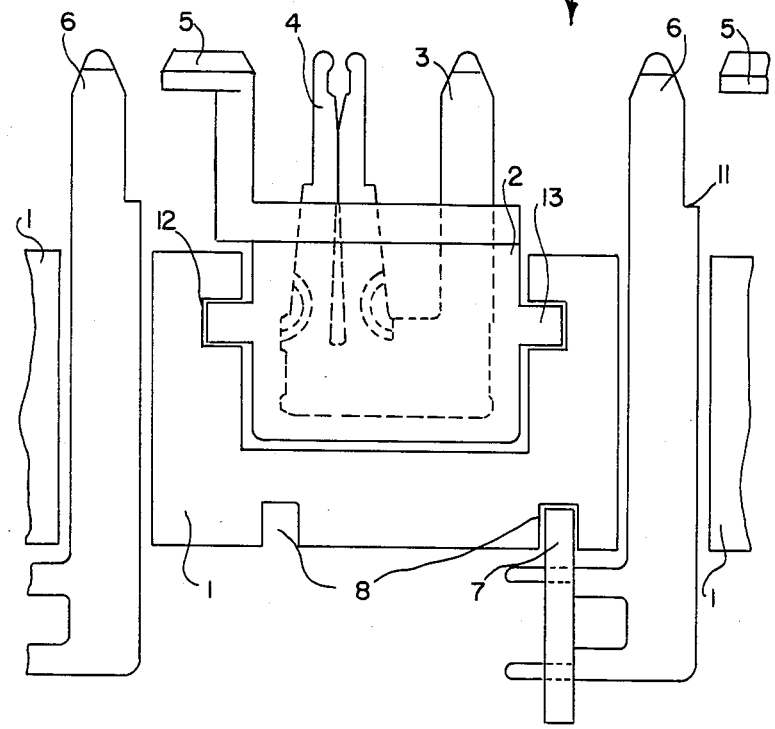
Figure 2:
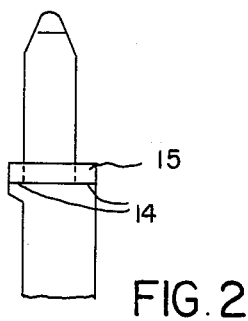
FIG. 2 shows a special embodiment of the plug pin attached to the printed circuit board.

The view shown in FIG. 1 illustrates the carrier 1 of a subassembly rack 30, specifically in a plan view, that is to say in the direction of insertion of a printed circuit board into the subassembly rack. The carrier 1 defines the upper guide for the printed circuit boards 7 inserted into the subassembly rack. FIG. 3 generally shows the rack, carrier and printed circuit board. The carrier 1 can be designed in such a way that it has two or even more guide slots 8 for a printed circuit board 7, the guide slots 8 being arranged so that, when several carriers 1 are mounted next to one another on the subassembly rack, there is always the same distance between the printed circuit boards 7.

The carrier 1 is open at the top and in the orifice has lateral guide slots 12 which serve for receiving the guide strips of an insert 2. The insert 2 can be pushed into the carrier 1 in the direction of insertion of the printed circuit board into the subassembly rack, the insert 2 being held in the vertical direction by means of guide slots 12 and guide strips 13. On the side facing the subassembly rack, the insert 2 can have means (not shown) for engagement into the subassembly rack or into the base plates of the latter, thus making it possible to obtain a releasable fastening in the horizontal direction. It thereby becomes possible to re-equip a subassembly rack with inserts 2, thus avoiding preliminary work and facilitating repairs to the insert 2.

The insert 2 has a wire clamp 4 for clamping an external line wire and is connected electrically to the plug pin 3 of the insert 2. The wire clamp 4 and plug pin 3 can be designed, for example, as a one-piece stamped article. The insert 2 can receive a plurality of terminals and is equipped with a wire guide comb 5.

Fastened to the printed circuit board 7 is plug pin 6 which projects upwards through the space between two adjacent carriers 1. Pin 6 ends level with the plug pin 3 of the insert 2. The plug pin 6 is attached to the printed circuit board 7, in such a way that, when inserted, it is connected to the subassembly rack via a knife strip or spring (not shown) and is aligned with the plug pin 3, so that an electrical connection can be made via the coupler plug 9 and its contacts 10. Just as a plurality of terminals can be attached to the insert 2, a plurality of plug pins 6 can also be attached to the circuit board 7. The plug pin 6 can likewise be designed as a stamped article and is equipped with a stop 11 for the coupler plug 9.

To maintain the distance between the relatively long plug pins 6, these can be equipped with a stop 14 which serves as a rest for a spacer strip 15. The spacer strip is produced from an insulating material, has appropriate orifices for the upper part of the plug pin and is of a thickness which is such that the top side of the spacer strip ends flush with the top side of the insert 2, so that these again form the stop for the coupler plug 9.

Figure 4B:
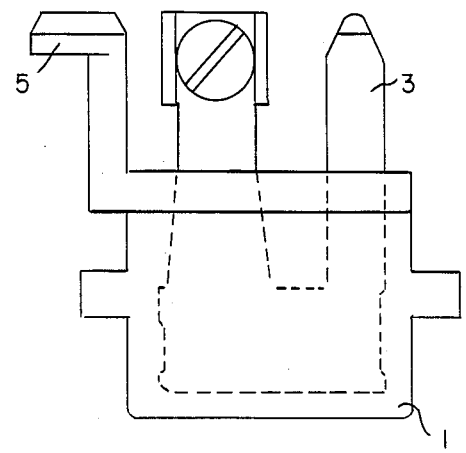
FIGS. 4A and 4B show various terminal configurations.
Figure 4A:
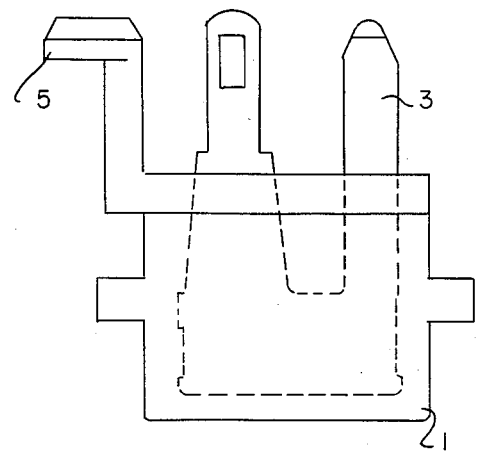

FIGS. 4A and 4B, respectively, show a soldering tab terminal, a clamping connector terminal and a threaded, screw terminal.

German Offenlegungsschrift No. 3,335,193 makes known a telephone exchange system with at least one rack for receiving push-in electrical subassemblies and at least one distribution device for the switching of subscriber lines, and in this the switching lines are guided directly to the electrical subassemblies of the racks and are connected electrically to these. In this known telephone exchange system, there are so-called distribution modules which are already arranged near a subassembly rack. In contrast to the present invention, however, in this known telephone exchange system it is not possible to do without lines between the distribution modules and the electrical subassemblies of the racks.

What is claimed is:

1. A disconnecting distribution frame for a telecommunication system, especially for a telephone extension system, comprising:

a plurality of electrical terminals arranged in pairs, each pair of terminals being equipped with corresponding plug contacts and being electrically interconnectable by means of a coupler plug, wherein a first plug contact is attached to a carrier (1) having at least one guide slot (8) for insertion of printed circuit boards (7), and a second plug contact being attached to one of the circuit boards (7).

2. A disconnecting distribution frame as claimed in claim 1, further comprising a wire guide comb (5) on an insert (2) for the carrier.

3. A disconnecting distribution frame as claimed in claim 1, wherein an insert (2) for said carrier and the printed circuit board (7) are equipped with a plurality of pairs of said plug pins (3, 6).

4. A disconnecting distribution frame as claimed in claim 1, wherein the electrical terminals include at least one of soldering tabs, clamping connectors and terminal screws.

5. A disconnecting distribution frame as claimed in claim 1, wherein the carrier (1) defines an upper guide slot for printed circuit boards received in a subassembly rack, wherein a plug pin (3) forming the first plug contact is attached to the carrier (1) so to point vertically upwards, and wherein a plug pin (6) forming the second plug contact is attached to the printed circuit board (7) likewise so as to point vertically upwards, such that said two plug pins (3, 6) are aligned with one another and opposite one another at a same height.

6. A disconnecting distribution frame as claimed in claim 5, wherein the plug pin (6) of the printed circuit board (7) has a stop (11) for holding the coupler plug (9), the stop (11) being aligned with a top side of an insert (2) for the carrier.

7. A disconnecting distribution frame as claimed in claim 6, wherein the plug pin (6) of the printed circuit board (7) has a stop (14) which serves as a rest for a spacer strip (15).

8. A disconnecting distribution frame as claimed in claim 7, wherein a top side of the spacer strip (15) resting on the stop (14) is aligned with a top side of the insert (2).

9. A disconnecting distribution frame as claimed in claim 1, wherein the first plug contact (3), together with a terminal (4) therefor, are accommodated in an insert (2) which is insertable into the carrier (1).

10. A disconnecting distribution frame as claimed in claim 9, wherein the insert (2) and the carrier (1) are equipped laterally with interfitting guide strips and guide slots, and wherein the insert (2) can be pushed into the carrier (1) in a same direction as the printed circuit board (7).

11. A disconnecting distribution frame as claimed in claim 10, wherein the insert (2) is engagable in the carrier (1).

12. A disconnecting distribution frame as claimed in claim 10, wherein the guide strips (13) protrude from the insert (2) into the guide slots (12), the guide slots being defined by the carrier (1).

13. A disconnecting distribution frame as claimed in claim 10, wherein the insert (2) is engagable with a subassembly rack receiving the printed circuit boards.

* * * * *